Feb. 11, 1964   J. W. GRAY   3,121,202
SINE-COSINE FREQUENCY TRACKER
Filed March 7, 1961   2 Sheets-Sheet 1
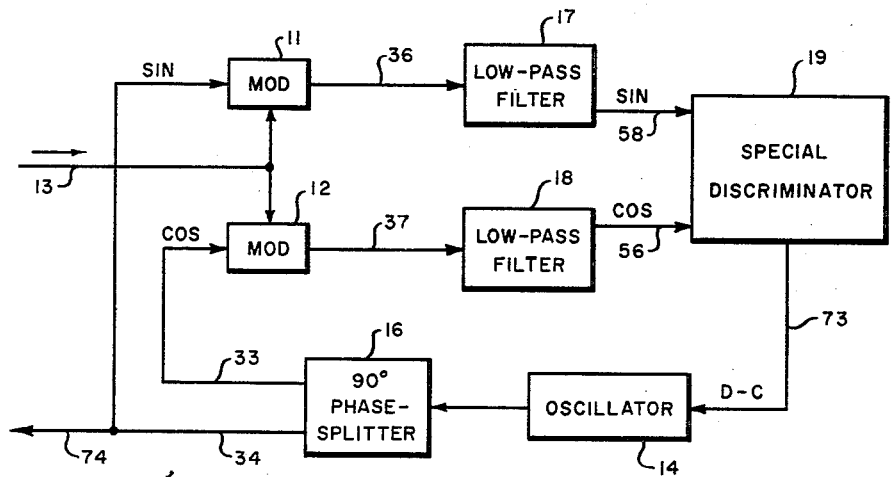
_Fig-1_
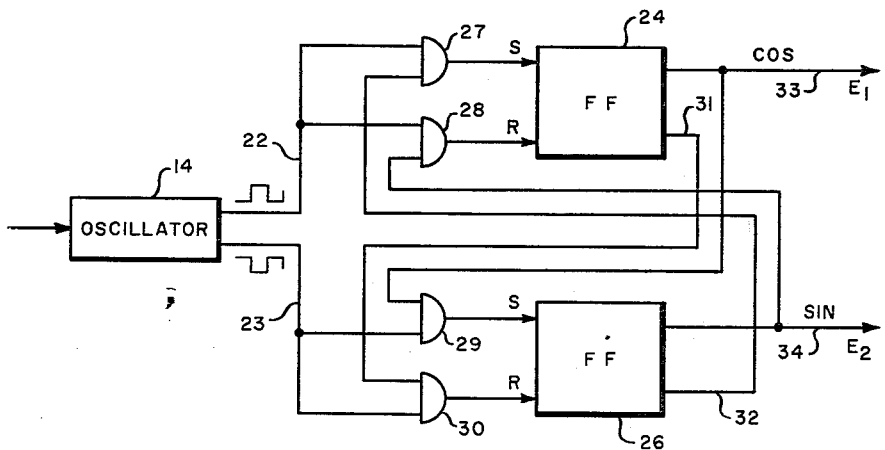
_Fig-2_
INVENTOR.
JOHN W. GRAY
BY *H. S. Mackey*
ATTORNEY.

Feb. 11, 1964   J. W. GRAY   3,121,202
SINE-COSINE FREQUENCY TRACKER
Filed March 7, 1961   2 Sheets-Sheet 2

INVENTOR.
JOHN W. GRAY
BY
ATTORNEY.

United States Patent Office 3,121,202
Patented Feb. 11, 1964

3,121,202
SINE-COSINE FREQUENCY TRACKER
John W. Gray, Pleasantville, N.Y., assignor to General Precision, Inc., a corporation of Delaware
Filed Mar. 7, 1961, Ser. No. 93,962
6 Claims. (Cl. 331—11)

This invention relates to automatic signal frequency trackers employing an error feedback loop with a zero-frequency modulation element.

Frequency trackers are required in aircraft navigational instruments employing the Doppler difference frequencies of microwave echo signals. The frequency spectrums of such echo signals fluctuate, making special apparatus necessary to track the fluctuating frequencies. Such an apparatus is termed a frequency tracker.

A frequency tracker of the type of the present invention has a modulator receiving both a Doppler echo signal and an oscillator signal of about the same frequency. The difference sideband of the modulator output, at about zero frequency, is applied through low-pass filters to a discriminator to provide an error signal. The error signal is then fed back to control the oscillator frequency.

It is necessary, in such a frequency tracker, to secure a discriminator output error signal which distinguishes, by its sense, the sense of the tracking error. The device of the instant invention obtains this error sense by applying to the discriminator two signals equal in frequency but separated in phase by 90°. These signals contain the tracking sense information and provide the required loop error sense.

In the present invention an adjustable oscillator output is split into two outputs having a 90° phase difference. They are applied to two balanced modulators which also receive the Doppler signal, the midfrequency of the Doppler signal spectrum being at balance equal to the oscillator frequency. The two outputs of the balanced modulators, after passage through two low-pass filters, are applied to a discriminator which produces a direct-current error signal having a magnitude and sign representative of the disparity between the oscillator frequency and the Doppler spectrum center frequency. This error signal is integrated and fed back to the oscillator, the frequency of which is thereby so changed as more closely to approximate the Doppler spectrum center frequency.

One purpose of this invention is to provide a simple and accurate signal frequency tracker employing two modulation product signals differing in phase by 90°.

Another purpose of this invention is to provide a closed loop frequency tracker in which the sign of the loop error signal is determined by the phase of a modulation product signal.

Still another purpose is to provide a closed loop frequency tracker containing as a loop component a pair of complementary phase shifters having the forms of a high-pass filter and a low-pass filter.

A further understanding of this invention may be secured from the detailed description and accompanying drawings, in which:

FIGURE 1 is a block diagram representing an embodiment of the invention.

FIGURE 2 depicts an oscillator and phase splitter which may be employed in the invention.

Figure 3:
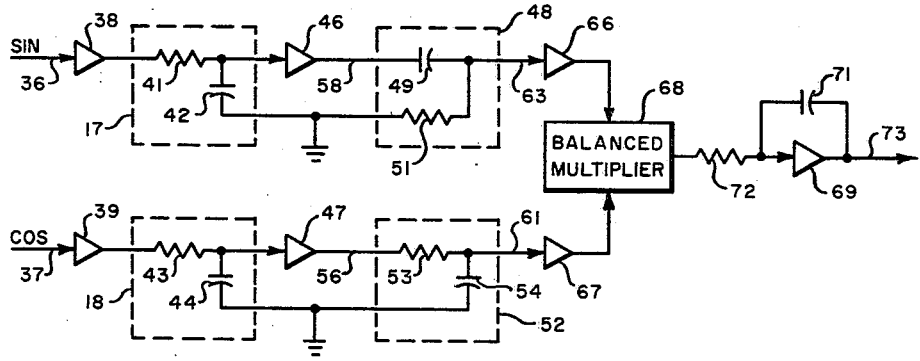
FIGURE 3 depicts filters and a special discriminator which may be used in the practice of the invention.

Referring now to FIGURE 1, two identical balanced modulators, 11 and 12, are provided. A Doppler signal is applied to both modulators through conductor 13. This signal consists of a frequency spectrum having a center frequency in the range of 2 to 20 kilocycles per second, and a width between 3 db points of the order of 15% of its center frequency. The form of the spectrum is approximately gaussian. The modulating signals applied to the modulators have the same frequency which is nominally equal to the Doppler spectrum center frequency and, when the feedback loop is balanced, is precisely equal to it. These modulating signals are generated by a single oscillator 14 with phase-split output having a range of 2 to 20 kc.p.s. The oscillator 14 is adjustable through this range by application of a variable direct voltage. The two outputs have identical frequencies that are in exact quadrature at all frequencies within the frequency range. These oscillator outputs constitute the modulating signals applied to the respective modulators 11 and 12.

The modulator outputs are applied to two, identical, low-pass filters 17 and 18. Each low-pass filter has a frequency transmission band of zero to 2000 cyclse per second. The functions of these filters are to eliminate the modulation upper side bands and a large part of the noise which usually accompanies Doppler signals. The two filter outputs are applied to a special discriminator 19 which has three functions; it includes a 90° phase splitter which changes the relative phases of all frequencies of the two signals applied to it by 90°; it discriminates by emitting a direct-current signal having a magnitude representative of the frequency applied to it and a sense representative of the phase sense of the two input signals, and it integrates the direct-current signal. The output of the special discriminator 19 is applied to control oscillator 14, which produces an oscillatory signal having a frequency approximately linearly proportional to the direct control voltage applied to it.

A suitable embodiment of the oscillator 14 combined with a phase-splitter such as component 16, is depicted in FIGURE 2. The oscillator 14 is adjustable by the application of a variable direct potential to produce an output signal having a frequency adjustable between the limits of 4 and 40 kc.p.c. This oscillator is conveniently of the free-running multivibrator type, and has two outputs of opposite phase at the two conductors 22 and 23. These outputs are approximately rectangular in form. They are applied to two bistable multivibrators, 24 and 26, used as scale-of-two circuits and commonly termed "flip-flops" when used as logic elements. Each has a set and a reset input and two outputs of opposite polarity. Conductor 22 is connected to the set and reset inputs of flip-flop 24 through two logical AND circuits, 27 and 28, and conductor 23 is connected to the inputs of flip-flop 26 through two AND circuits, 29 and 30. The four outputs 31, 32, 33 and 34 are interconnected to the four AND circuit inputs so that one of the useful outputs, 33, is always ahead of the other useful output, 34, by 90°, and cannot inadvertently operate at opposite phase. The outputs on conductors 33 and 34 therefore have identical frequencies, half that of the oscillator 14, and have a range of 2 to 20 kc.p.s. The phase of the output 33 remains exactly 90° ahead of that of output 34 at all frequencies within the range. Therefore, if the fundamental component of the output at conductor 33 is expressed by $$E_1 = E \cos \omega_{LO} t \qquad (1)$$

in which E is a constant and $\omega_{LO}$ is the phase splitter output frequency, then the output at conductor 34 is $$E_2 = E \cos \omega_{LO} t - 90° = E \sin \omega_{LO} t \qquad (2)$$

A suitable form of the special discriminator 19 is shown in FIGURE 3, together with a schematic illustration of the low pass filters 17 and 18. Output conductors 36 and 37 of modulators 11 and 12, FIGURE 1, are applied through amplifiers 38 and 39, FIGURE 3, to two identical low-pass filters 17 and 18. Filter 17 consists of a resistor 41 and capacitor 42 and filter 18 consists of a resistor 43 and capacitor 44. Resistors 41 and 43 are identical in resistance and capacitors 42 and 44 are identical in capacitance. Thus these two low-pass filters, 17 and 18, not only have identical frequency transmission bands but also retard the output potential phase relative to the input potential phase by exactly equal amounts. Making these two filters identical has the result that the relative phase difference between the two branches is exactly the same after signal passage through the filters as before the passage through them.

The filter outputs are amplified in amplifiers 46 and 47. These and the four other amplifiers shown in the two branches of FIGURE 3 have the function of amplification to make up for network losses and of impedance adjustment to drive the basic circuit components. Equal gain in the two channels is not essential to accurate operation of the frequency tracker.

The output of amplifier 46 is applied to a potential phase advance circuit 48 consisting of a series capacitor 49 and shunt resistor 51. The output of amplifier 47 is applied to a potential phase retardation circuit 52 consisting of a series resistor 53 and a shunt capacitor 54. These two circuits have identical time constants. The component magnitudes are so chosen that, at a frequency near midrange, phase advance circuit 48 advances the output voltage by 45° and phase retard circuit 52 retards the output voltage by 45°. At any given frequency, the total phase difference of the two branches produced by these two circuits 48 and 52, taken together, is exactly 90°. Thus the two phase shift circuits are complementary in the sense that the phase shift angles which they produce are complementary.

The signals in conductors 63 and 61 are applied to two amplifiers 66 and 67, and the output signals are multiplied together in a multiplier 68, which may be any form of balanced modulator which transmits the D.-C. component of the product. The output is integrated in an electronic integrator including a high-gain amplifier 69, shunt capacitor 71 and series resistor 72, with output at conductor 73.

In the operation of the frequency tracker of FIGURE 1, the unshifted output of the oscillator 14 at conductor 33 was described by a cosine function in Equation 1. The output at conductor 34, being phase retarded by 90° was described in Equation 2 by the sine function of the same angle. Thus the functions applied as modulating signals to the modulators 11 and 12 can be regarded as sine and cosine functions of the same angle for each frequenucy component of the Doppler spectrum.

The lower sideband outputs from modulators 11 and 12 are separated by 90° in phase, although identical in frequency. The output in conductor 36 has a voltage variation characterized as $\sin(\omega_{LO}-\omega_D)t$, and in conductor 37 as $\cos(\omega_{LO}-\omega_D)t$. In these terms $\omega_{LO}$ is the phase splitter output frequency and $\omega_D$ is the Doppler frequency. The two outputs have identical center frequencies representing the error in the match between the Doppler spectrum center and the modulating frequency. The modulator outputs do not contain the input frequencies because the modulators are balanced. The outputs do contain the upper sidebands but these are eliminated by the filters, as well as much of the Doppler signal noise.

Figure 4:
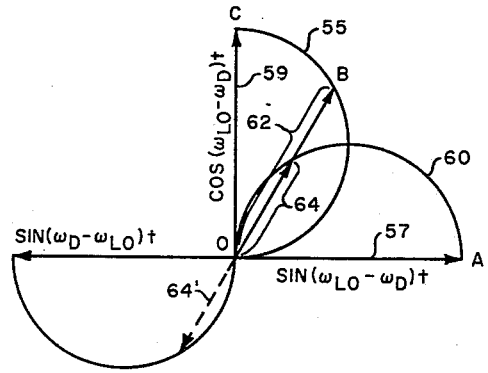
FIGURES 4 and 5 are diagrams illustrating the operation of the invention.

After passage of the two signals through the filters, conductors 58 and 56 the signals are in quadrature as indicated above, and can be depicted by the vectors 57 and 59, FIGURE 4, respectively.

The phase shifter 48, FIGURE 3, advances the phase of the applied signal. This is indicated in FIGURE 4 by advance of the vector 57 to the position 64. The phase shifter 52, FIGURE 3, retards the phase of the applied signal, as indicated in FIGURE 4 by retardation of the vector 59 to the position 62. Phase shifts have been chosen for this example which are respectively greater and less than 45° but which add to 90°. It is not necessary to keep the phase change of each phase shifter constant during a change of frequency over the entire range of the instrument. This would be very difficult, and has until now prevented development of similar methods. However, only the sum of the two shifts must be kept constant. The sum of the angle AOB and angle BOC must be 90°. It is completely immaterial if one angle is small and the other large, so long as their sum is 90°. The simple circuits 48 and 52 do just this. Although each is highly frequency-sensitive, they maintain a phase sum of 90° throughout the entire frequency range of the oscillator. Therefore, this sum, added to the phase separation of 90° which the signals have on entering the phase shifter, makes a total phase separation of either zero or 180°.

This is shown by the vector diagram of FIGURE 4. The locus of the output voltage vector at conductor 61 is semicircle 55, defining both amplitude and phase. The locus of the other output voltage vector at conductor 63 is semicircle 60. When $\omega_{LO}>\omega_D$, the relations are as shown. When $\omega_D>\omega_{LO}$, the cosine does not change sign but the sine does, so that vectors 62 and 64' remain in line but point in opposite directions, being 180° apart. Thus the difference (or sum) of the phase shifts of the two circuits 48 and 52 is always constant. It follows that the alternating-current error signals applied to the balanced multiplier 68 are always at 180° or 0° relative phase.

Figure 5:
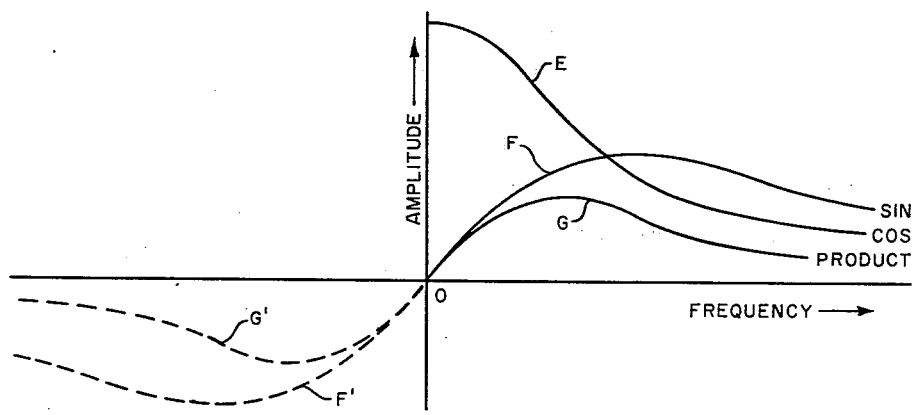

The frequency-amplitude characteristic of a low-pass filter or phase-retarding circuit such as circuit 52 in tandem with low-pass filter 18 is shown by graph E, FIGURE 5. The characteristic of a phase-advancing circuit, such as circuit 48, combined in tandem with the low-pass filter 17, is shown by graph F. The product of characteristics E and F is shown by graph G. The multiplication to form this product is carried out by the balanced multiplier 68. When the phase difference is reversed in sign, the lower branch G' of the curve is traced. Thus the behavior of this combination of components is that of a discriminator. Since the two frequencies applied to the multiplier 68 are always exactly the same, the output is a direct current having a sign representing either the branch G or the branch G' of the characteristic. The output is integrated in the following integrator and the integrator output at conductor 73 is a direct potential which increases or decreases continually at a rate depending on the input amplitude and sign, and remains constant at its attained value when the input falls to zero. This integrated potential change is applied through conductor 73 to oscillator 14, FIGURE 1, to change its frequency in such direction as to reduce the error signal in resistor 72, FIGURE 3, to zero, when the oscillator is held constant at this attained frequency.

The frequency tracker output is best secured from the oscillator, as at conductor 74, FIGURE 1, the frequency of the signal there identically representing the frequency of the center of the Doppler spectrum applied to conductor 13. Alternatively, the output may be secured from conductor 73 in the form of a direct potential proportional to the Doppler center frequency. This output, however, will be in error in proportion to the oscillator non-linearity.

What is claimed is:

1. A frequency tracker comprising, an adjustable generator emitting at least one alternating current signal, a source of signals of unknown frequency, first modulator means for obtaining a first beat frequency signal from said adjustable generator output signal and said signals of unknown frequency, second modulator means for obtaining a second beat frequency signal from said adjustable generator output signal and said signals of unknown frequency, means causing the phase of said second beat frequency signal either to lag or to lead the phase of said first beat frequency signal by 90° depending on the sense of the difference in frequency of said generator signal and said signal of unknown frequency, a pair of similar filters respectively filtering said first and second beat frequency signals, a phase lag circuit energized by the output of one of said filters, a phase lead circuit energized by the output of the other of said filters, the signal outputs of said phase lag and lead circuits having a relative phase separation which differs by 90° from the phase separation of the signals applied to the input thereof, said 90° phase difference being unaffected by changes in frequency, a balanced multiplier multiplying said emitted two signals to form a direct-current error signal, means integrating said error signal to form an integral signal, and means applying said integral signal to control the frequency of said generator so as to reduce said error signal amplitude.

2. A frequency tracker comprising, an adjustable oscillator having two outputs in phase quadrature, a pair of modulators, means applying a signal to be tracked to said pair of modulators, means applying said two oscillator outputs to respective ones of said pair of modulators whereby the two output signals thereof containing difference frequencies are in phase quadrature, a pair of low-pass filters respectively filtering said two output signals, a phase lag circuit energized by the output of one of said filters, a phase lead circuit energized by the output of the other of said filters, the signal outputs of said phase lag and lead circuits having a relative phase separation which differs by 90° from the phase separation of the signals applied to the input thereof, said 90° phase difference being unaffected by changes in frequency, a balanced multiplier multiplying said emitted two signals to form a direct-current error signal, means integrating said error signal to form an integral signal, and means applying said integral signal to control the frequency of said oscillator so as to reduce said error signal amplitude whereby the oscillator frequency becomes equal to the center frequency of said signal to be tracked.

3. A frequency tracker in accordance with claim 2 in which said phase lag circuit consists of a resistor connected in series and a capacitor connected in shunt, the product of the resistance of said resistor and the capacitance of said capacitor having a selected value, and in which said phase lead circuit consists of a capacitor connected in series and a resistor connected in shunt, the product of the resistance and capacitance thereof having said selected value.

4. A frequency tracker in accordance with claim 2 in which said phase lag circuit consists of a resistor having a selected resistance connected in series and a capacitor having a selected capacitance connected in shunt, and in which said phase lead circuit consists of a capacitor having said selected capacitance connected in series and a resistor having said selected resistance connected in shunt.

5. A frequency tracker comprising, a voltage-controlled adjustable-frequency oscillator, a phase splitter actuated thereby and having first and second outputs of the same frequency but in phase quadrature, first and second modulators, a signal spectrum source of unknown center frequency, means applying said signal spectrum of unknown center frequency as one input of each of said modulators, means applying said first output to said first modulator and said second output to said second modulator whereby the modulators emit first and second difference frequency signals in mutual phase quadrature, first and second identical low-pass filter circuits having equal phase lag characteristics, means applying respective first and second difference frequency signals to respective first and second said filter circuits, a phase lead circuit connected to said first filter circuit output, a phase lag circuit connected to said second filter circuit output, the time constants of said phase lead and lag circuits being identical, a balanced multiplier, means applying the outputs of said phase lead and lag circuits to said balanced multiplier to produce a direct-current error signal representing the product thereof, an integrating circuit having said error signal impressed thereon and emitting a direct-current signal representing the integral thereof, and means applying said integral signal to said adjustable-frequency oscillator in such direction as to cause said error signal to approach zero amplitude, thereby bringing the output frequency of said phase splitter into equality with the center frequency of said signal spectrum.

6. A frequency tracker in accordance with claim 5 in which the first output of said phase splitter has a voltage variation characterized by the expression $\sin \omega_{LO} t$ and the record output of said phase splitter has a voltage variation characterized by the expression $\cos \omega_{LO} t$.

References Cited in the file of this patent
UNITED STATES PATENTS
2,481,659    Guanella _____ Sept. 13, 1949